United States Patent [19]

Sasakura

[11] Patent Number: 5,940,241
[45] Date of Patent: Aug. 17, 1999

[54] IMAGE SIGNAL RECORDING SYSTEM FOR RECORDING AN IMAGE SIGNAL ON A RECORDING MEDIUM

[75] Inventor: Takao Sasakura, Kanagawa, Japan

[73] Assignee: Canon Kabushiki Kaisha, Tokyo, Japan

[21] Appl. No.: 08/278,987

[22] Filed: Jul. 22, 1994

Related U.S. Application Data

[63] Continuation of application No. 07/802,052, Dec. 3, 1991, abandoned.

[30] Foreign Application Priority Data

Dec. 21, 1990 [JP] Japan ..................................... 2-404750

[51] Int. Cl.⁶ ................................................... G11B 5/596
[52] U.S. Cl. ....................... 360/78.04; 386/120; 386/121; 386/125
[58] Field of Search ............................... 360/35.1, 55, 75, 360/77.02, 78.01, 78.04, 106, 77.04, 77.06; 358/909, 335, 909.1; 386/108, 120, 121, 124, 125; 369/53, 54, 58

[56] References Cited

U.S. PATENT DOCUMENTS

| 4,746,993 | 5/1988 | Tada | 360/35.1 X |
| 4,825,324 | 4/1989 | Miyake et al. | 360/35.1 |
| 5,115,357 | 5/1992 | Nakamura | 360/35.1 X |
| 5,122,899 | 6/1992 | Kaji | 360/35.1 X |

FOREIGN PATENT DOCUMENTS 0155505  6/1983  Japan ..................................... 358/335

OTHER PUBLICATIONS

An Arrangement For Storage And Retrieval Of Data From Videodisks ATT Technical Digest No. 77, Oct. 1985.

Primary Examiner—Andrew L. Sniezek
Attorney, Agent, or Firm—Robin, Blecker & Daley

[57] ABSTRACT

An image signal recording system for recording an image signal on a recording medium has a first recording mode in which the image signal is recorded only in a first area on the recording medium and a second recording mode in which the image signal is recorded in either of first area and a second area located on the recording medium in a position different from the first area. In the second recording mode, the image signal is recorded starting from the second area, so that image signal recording efficiency can be increased to give a great economic advantage.

6 Claims, 2 Drawing Sheets

IMAGE SIGNAL RECORDING SYSTEM FOR RECORDING AN IMAGE SIGNAL ON A RECORDING MEDIUM

This is a continuation application under 37 CFR 1.62 of prior application Ser. No. 07/802,052, filed Dec. 3, 1991 now abandoned.

BACKGROUND OF THE INVENTION

1. Field of the Invention

This invention relates to an image signal recording system for recording image signals on a recording medium.

2. Description of the Related Art

An electronic still video camera system has been known as an image signal recording and reproducing system for recording and reproducing image signals on and from a recording medium.

The electronic still video camera system is arranged to use a magnetic disc measuring two inches in diameter. One field amount of still image signal is recorded in each of 50 recording tracks formed in a concentric state on the magnetic disc after the following processes: The luminance signal component of the image signal is frequency-modulated. The color-difference signal components of two different kinds of the image signal are converted into a color-difference line-sequential signal component and, after that, are also frequency-modulated. The two frequency-modulated signal components thus obtained are frequency-multiplexed into a recording image signal before recording. One field amount of the recording image signal thus obtained is recorded in each recording track on the recording medium. The recorded image signal is reproduced by performing a converting action in a manner reverse to the converting action performed in recording the image signal.

The electronic still video camera system has two different modes of operation for obtaining two different recording formats. One is a field recording and reproducing mode in which one field amount of still image signal forming one picture of still image is recorded and reproduced in and from one recording track, so that the number of still images recordable on one magnetic disc can be increased. The other is a frame recording and reproducing mode in which one frame amount, corresponding to two field amounts, of still image signal forming one picture of still image is recorded in two recording tracks with one field recorded in one recording track and the other field recorded in the other recording track. Though the number of recordable still images on one magnetic disc decreases to half, the still images can be recorded and reproduced with a higher picture quality.

As mentioned above, the electronic still video camera system is arranged to record one picture amount of still image signal in two recording tracks on the magnetic disc in the above-stated frame recording and reproducing mode. In this mode, therefore, a maximum number of recordable frame image signals is only for 25 pictures while the number of recordable tracks on one magnetic disc is specified to be 50 for the format of the electronic still video camera system. The conventional still video camera system thus has presented a problem in respect to economy.

SUMMARY OF THE INVENTION

It is a general object of this invention to provide an image signal recording system which is capable of solving the above-stated problem of the prior art.

It is a more specific object of the invention to provide an image signal recording system which is capable of efficiently recording image signals to have a great economic advantage.

Under this object, an image signal recording system for recording an image signal on a recording medium is arranged as an embodiment of this invention to comprise: recording means capable of recording an image signal in either of a first area on the recording medium and a second area different from the first area on the recording medium; and recording action control means for controlling a recording action of the recording means either in a first recording mode in which the image signal is recorded only in the first area or in a second recording mode in which the image signal is recorded in either of the first area and the second area, the recording action control means being arranged to cause the recording action to start from the second area on the recording medium when recording the image signal in the second recording mode.

It is another object of the invention to provide an image signal recording system which is capable of efficiently recording image signals while retaining interchangeability with the conventional image signal recording system.

Under that object, an image signal recording system for recording an image signal on a recording medium is arranged as an embodiment of this invention to comprise: the image signal recording medium provided with a first area having a plurality of recording tracks in each of which one field amount of the image signal is recorded and a second area having a plurality of recording tracks in a position different from the position of the first area; recording means capable of recording the image signal in either of the first area and the second area; and recording action control means arranged to have a frame recording mode in which one frame amount of the image signal is recorded and a field recording mode in which one field amount of the image signal is recorded and to control a recording action of the recording means in such a manner that, when recording one frame amount of the image signal in the frame recording mode, one frame amount of the image signal is recorded in two adjacent recording tracks having no image signal recorded therein within the first area of the recording medium if two adjacent recording tracks having no image signal recorded therein do not exist in the second area of the recording medium.

It is a further object of the invention to provide an image signal recording method which permits image signal recording to be efficiently carried out to give a great advantage in respect to economy.

Under the above-stated object, a method for recording an image signal on a recording medium having a first area and a second area different from the first area is arranged according to this invention to comprise: a first step of designating either a first recording mode in which the image signal is recorded only in the first area of the recording medium or a second recording mode in which the image signal is recorded in either of the first area the and second area; and a second step of causing a recording action on the image signal to start from the second area of the recording medium if the second recording mode is designated by the first step.

It is a still further object of the invention to provide an image signal recording method which permits image signal recording to be efficiently carried out while retaining interchangeability with the conventional image signal recording method.

Under that object, an image signal recording method for recording an image signal on a recording medium having a first area having a plurality of recording tracks in each of which one field amount of the image signal is recorded and a second area having a plurality of recording tracks in a position different from the position of the first area is arranged according to this invention to comprise: a first step of designating either a first recording mode in which the image signal is recorded only in the first area of the recording medium or a second recording mode in which the image signal is recorded in either of the first area and the second area of the recording medium; a second step of designating either a frame recording mode in which one frame amount of the image signal is recorded or a field recording mode in which one field amount of the image signal is recorded; a third step of detecting whether or not two adjacent recording tracks having no image signal recorded therein exist within the second area of the recording medium if the second recording mode is designated by the first step and the frame recording mode is designated by the second step; and a fourth step of recording one frame amount of the image signal in two adjacent tracks having no image signal recorded therein within the first area of the recording medium if it is detected by the third step that two adjacent recording tracks having no image signal recorded therein do not exist within the second area of the recording medium.

The above and other objects and features of the invention will become apparent from the following detailed description of an embodiment thereof taken in connection with the accompanying drawings.

DETAILED DESCRIPTION OF THE PREFERRED EMBODIMENT

Figure 1:
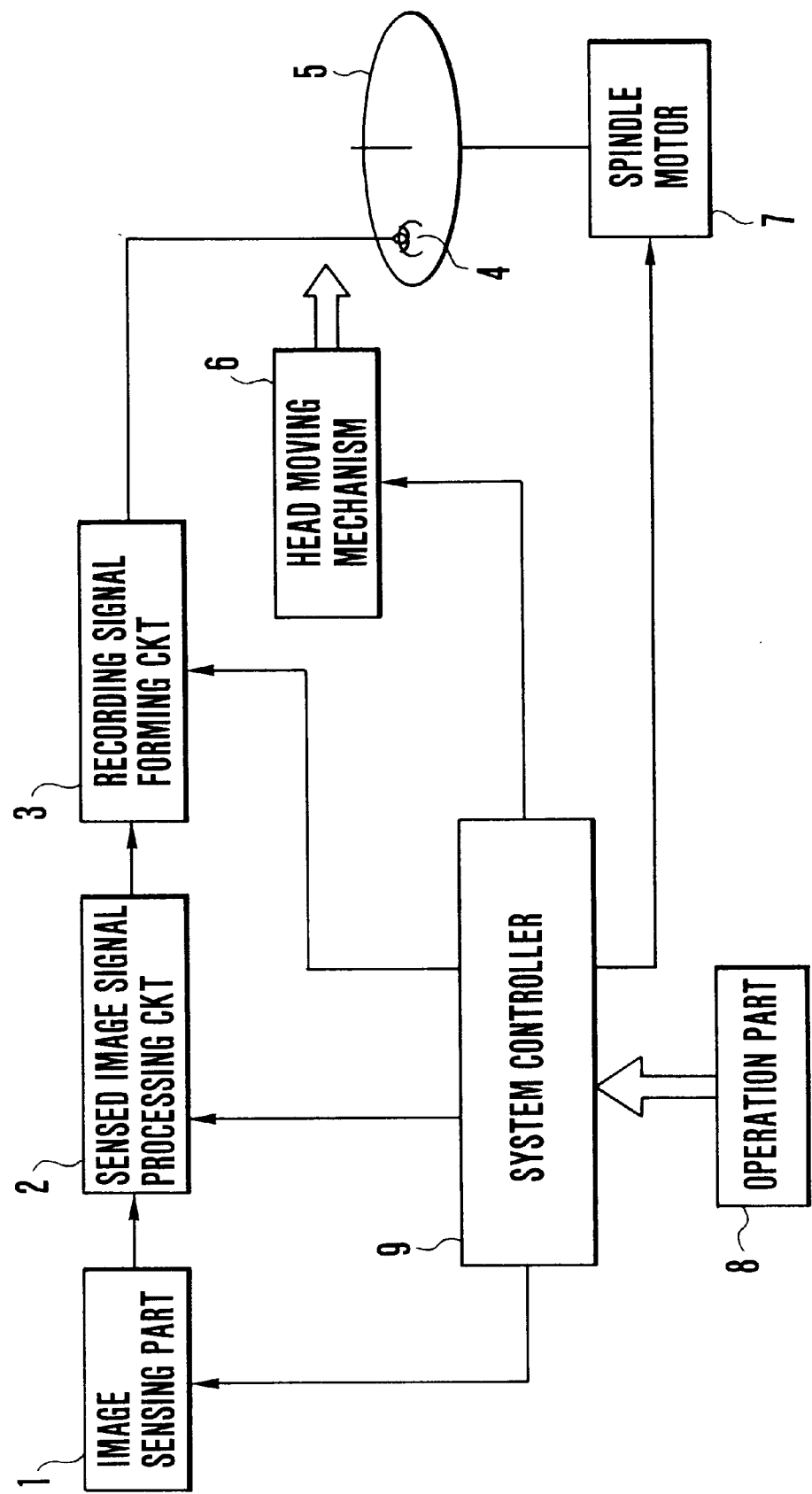
FIG. 1 is a block diagram showing in outline the arrangement of a recording apparatus included in an electronic still video camera system to which this invention is applied.

The following describes this invention through an embodiment thereof: FIG. 1 shows in outline the arrangement of a recording apparatus included in an electronic still video camera system to which this invention is applied as an embodiment thereof.

Referring to FIG. 1, an image sensing part 1 is composed of an optical system, an image sensor, etc., and is arranged to convert a sensed image of an object into an image signal. A sensed image signal processing circuit 2 is arranged to perform various signal processing actions including a gamma correction process, an aperture correction process, etc., on the image signal formed by the image sensing part 1. A recording signal forming circuit 3 is arranged to form and output a recording signal by performing the following processes on the image signal processed and outputted from the sensed image signal processing circuit 2: The luminance signal component of the image signal is frequency-modulated after an emphasizing process. Two kinds of color-difference signal components which are included in the image signal is frequency-modulated after they are converted into a color-difference line-sequential signal and subjected to an emphasizing process. The frequency-modulated signal components thus obtained are frequency-multiplexed with each other. The recording signal is formed by adding, to the signal components, a known ID signal which is supplied from a system controller 9 and consists of codes of varied kinds including, among others: a code indicating the track numbers of recording tracks on a magnetic disc 5; a field/frame discrimination code indicating whether the system is in a field recording/reproducing mode or in a frame recording/reproducing mode; a code indicating the year, month and day; and a code indicating the hour, minute and second. A magnetic head 4 is arranged to record, on the magnetic disc 5, the recording signal outputted from the recording signal forming circuit 3. The magnetic disc 5 is employed as a recording medium. A head moving mechanism 6 is arranged to move the magnetic head 4 in the radial direction of the magnetic disc 5. A spindle motor 7 is arranged to rotate the magnetic disc 5. An operation part 8 is provided for instructing the recording apparatus to perform various actions. The system controller 9 is arranged to instruct and control applicable parts to cause them to act in accordance with the instructions given from the operation part 8 and also to supply the above-stated ID signal to the recording signal forming circuit 3.

In the case of the recording apparatus of this embodiment, an area (hereinafter, referred to as an extended track area) is provided on the magnetic disc for forming additional recording tracks on the radially outer side of an area (hereinafter, referred to as an ordinary track area) in which a total of 50 recording tracks are to be formed on the magnetic disc in accordance with the standard format specified for the electronic still video camera system as mentioned in the foregoing. Therefore, the recording apparatus has an extended-track-area using mode in addition to an ordinary-track-area using mode in which a still image signal is recorded by using the ordinary track area. In the extended-track-area using mode, the magnetic head 4 is moved by the head moving mechanism 6 onto the above-stated extended track area to record an image signal in the extended track area, so that the number of still images recordable on one magnetic disc can be increased.

Further, an improvement in the electro-magnetic conversion characteristic of the magnetic head and the magnetic recording medium and the advancement of technology for making the track width of the magnetic head narrower enable the embodiment to form a maximum of 16 or thereabout of recording tracks within the extended track area on the magnetic disc.

Figure 2:
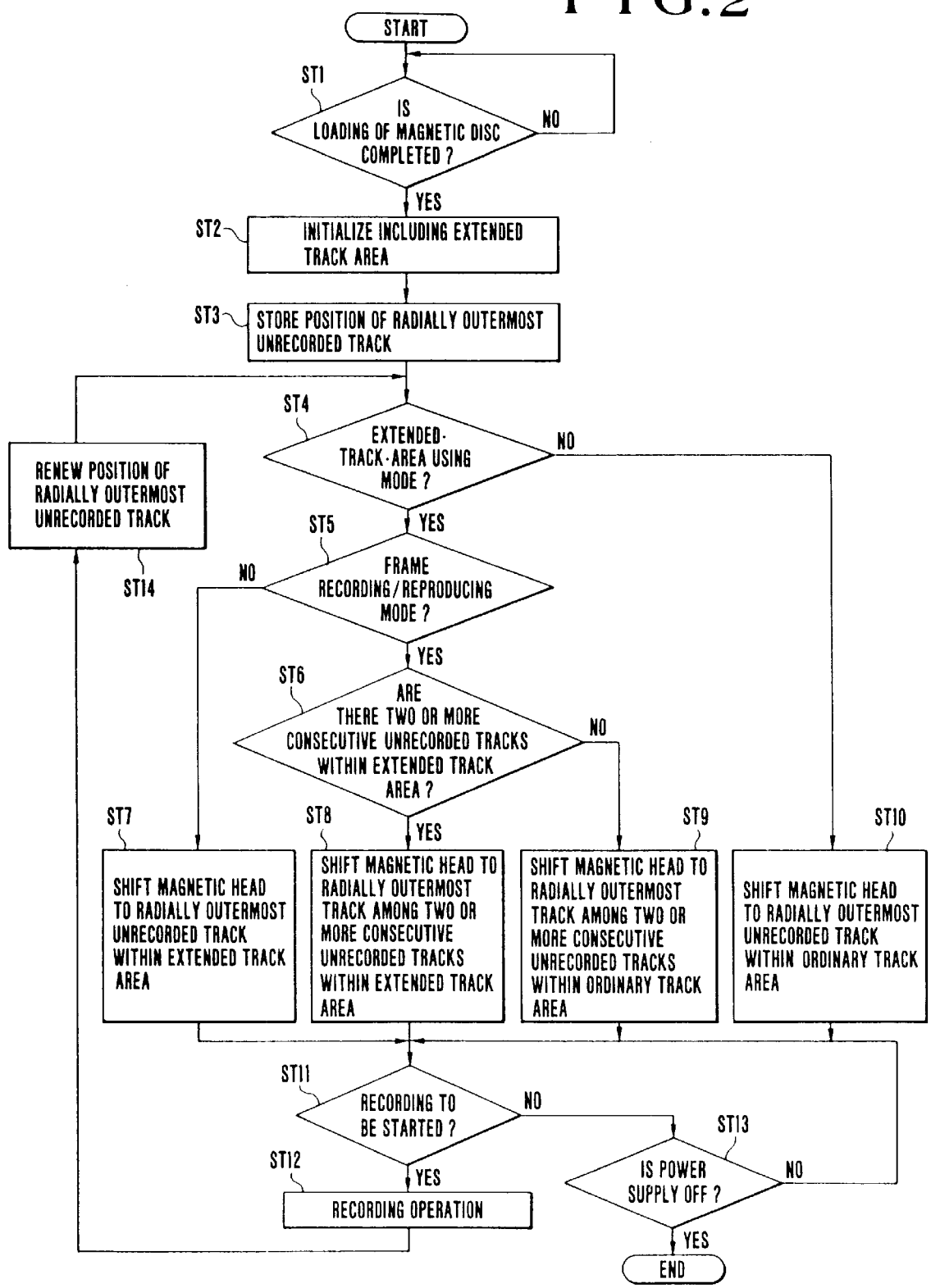
FIG. 2 is a flow chart showing the operation of the recording apparatus shown in FIG. 1.

FIG. 2 is a flow chart showing the operation of the recording apparatus shown in FIG. 1. The operation of the recording apparatus is described below with reference to the flow chart of FIG. 2:

The operation part 8 of FIG. 1 is first operated to turn on the power supply switch of the recording apparatus. The system controller 9 begins to operate. Steps ST1, ST2 and ST3: The system controller 9 detects, by means of a sensor or the like disposed at a magnetic disc holder or the like which is not shown, whether or not the magnetic disc 5 has been loaded and set in a given position. When the magnetic disc 5 is set in this position, the system controller 9 causes the magnetic disc 5 to be rotated by the rotation of the spindle motor 7. At the same time, the system controller 9 instructs the head moving mechanism 6 to move the magnetic head 4 over the whole range of recording tracks on the magnetic disc 5 from the position of the radially outermost track of the extended track area to the position of the radially innermost track of the ordinary track area by moving the magnetic head 4 from one track to another one by one. During this movement of the magnetic head 4, signals are reproduced from each track. The envelope levels of the reproduced signals are detected by means of an envelope detector which is not shown.

An initializing action is thus performed by determining the track currently traced by the magnetic head 4 to be a recorded track (having a signal recorded therein) if the envelope level detected by the envelope detector is above a given level, or to be an unrecorded track (having no signal recorded therein) if the envelope level is below the given level. A discrimination is made between a recorded state and an unrecorded state in this manner for every recording track on the magnetic disc 5 loaded. Information on the positions of unrecorded tracks of the extented track area and the positions of unrecorded tracks of the ordinary track area is stored in a memory which is disposed in the system controller 9.

Steps ST4 and ST10: The system controller 9 makes a check to find if the extended-track-area using mode has been selected at the operation part 8. If not, the head moving mechanism 6 is controlled and caused, on the basis of the information stored at the memory in the system controller 9, to move the magnetic head 4 to a radially outermost unrecorded track within the ordinary track area.

Steps ST5 and ST7: In a case where the extended-track-area using mode is selected at the operation part 8, a check is made to find whether the field recording/reproducing mode is selected or the frame recording/reproducing mode is selected also at the operation part 8. If the field recording/reproducing mode is found to have been selected, the head moving mechanism 6 is controlled on the basis of the information stored at the memory disposed in the system controller 9. With the head moving mechanism 6 thus controlled, the magnetic head 4 is moved onto a radially outermost unrecorded track within the extended track area.

Steps ST6, ST8 and ST9: If the frame recording/reproducing mode is found to have been selected, a check is made, according to the information stored at the memory of the system controller 9, to find if there are two or more consecutive unrecorded tracks within the extended track area. If so, the head moving mechanism 6 is controlled on the basis of the information stored at the memory of the system controller 9 to move the magnetic head 4 to a radially outermost track among the two or more consecutive unrecorded tracks within the extended track area. If not, the magnetic head 4 is moved to a radially outermost track among two or more consecutive unrecorded tracks within the ordinary track area.

Steps ST11, ST12 and ST14: Next, the system controller 9 makes a check to find if the operation part 8 has been operated to give an instruction for commencement of a recording action, that is, to find if a recording trigger switch is operated. If so, the image sensing part 1, the sensed image signal processing circuit 2, the recording signal forming circuit 3, the head moving mechanism 6 and the spindle motor 7 are controlled to perform a recording action on a still image signal. At the same time, the information stored in the memory of the system controller 9 relative to the position of a radially outermost unrecorded track is renewed as applicable. The flow of operation then comes back to the step ST4 to repeat the sequence of processes of the steps ST4 to ST10, as shown in FIG. 2.

Step ST13: In a case where the recording trigger switch has not been operated, the flow comes back to the step ST11 if the power supply switch of the apparatus is not in an off-state, and there is obtained a recording standby state. When the power supply switch is turned off, the flow of operation comes to an end.

As described in the foregoing, the embodiment has the extended-track-area using mode. In this mode, the still image signal can be recorded within the extended track area located on the radially outer side of the ordinary track area which is provided on the magnetic disc for having a total of 50 recording tracks according to the format of the conventional electronic still video camera system. The still image signal is recorded in the extended track area only when the extended-track-area using mode is designated. With the use of the extended track area designated, the still image signal is recorded in unrecorded tracks one by one beginning at a track located radially outermost in the extended track area. In a case where the extended-track-area using mode is not designated, the embodiment performs the recording action in the same manner as the conventional electronic still video camera system. The invented arrangement thus enables the system to efficiently record and reproduce still image signals without impairing interchangeability with the conventional still video camera system, so that the economical advantage of the system can be enhanced.

Further, in reproducing the still image signal recorded in the extended track area by the recording apparatus of the embodiment described above, the magnetic head is moved in the same manner as the initializing action performed when the magnetic disc is loaded to find whether any still image signal is recorded in the extended track area. Then, according to the result of this action, a moving range of the magnetic head relative to the magnetic disc is decided either to include or not to include the extended track area in the moving range.

As described in the foregoing, the image signal recording and reproducing system according to this invention is capable of efficiently recording image signals to give a greater economic advantage.

What is claimed is:

1. An information signal recording device for recording an information signal on a disc-shaped recording medium which consists of a first recording area composed of a plurality of annular tracks arranged concentrically to each other and a second recording area coaxially arranged relative to the first recording area and composed of a plurality of annular tracks arranged concentrically to each other with the first and second recording areas being stationarily set, said device comprising:

a) recording means, having a head, arranged to move the head to an annular track on which the information signal is recordable, said annular track being located within the first recording area among the plurality of annular tracks formed on the disc-shaped recording medium, and to record the information signal on the first recording area of the disc-shaped recording medium or to move the head to an annular track on which the information signal is recordable, said annular track being located within the second recording area among the plurality of annular tracks formed on the disc-shaped recording medium, and to record the information signal on the second recording area of the disc-shaped recording medium;

b) recording mode instruction means arranged to have a first recording mode in which, when the information signal is continuously recorded by using the plurality of annular tracks, the information signal is recorded by using only the plurality of annular tracks in the first recording area by restricting the head to be moveable only in the first recording area, and a second recording mode in which the information signal is recorded by using the plurality of annular tracks in the first and second recording areas by making the head moveable across the first and second recording areas and further arranged to instruct the recording means so as to perform the recording operation of the information signal according to the first recording mode or the second recording mode; and c) recording operation control means for controlling the recording operation of the information signal by the recording means so as to, when the recording means is instructed by the recording mode instruction means to record the information signal according to the second recording mode, start performing the recording operation of the information signal on the plurality of annular tracks located within the second recording area of the disc-shaped recording medium other than the plurality of annular tracks located within the first recording area of the disc-shaped recording medium.

2. A device according to claim 1, wherein said recording operation control means is arranged to control the recording operation on the information signal of said recording means in such a manner that, when the recording means is instructed in the recording mode instruction means to record the information signal in accordance with the second recording mode, the information signal is recorded by moving said head to the annular tracks within the second recording area on the disc-shaped recording medium, one after another, starting from an annular track which is located on the outer side of the disc-shaped recording medium and has no information signal recorded therein toward another annular track which is located on the inner side of the disc-shaped recording medium.

3. A device according to claim 1, wherein said recording operation control means is arranged to control the recording operation on the information signal of said recording means in such a manner that, when the recording means is instructed in the recording mode instruction means to record the information signal in accordance with the second recording mode, it is detected whether or not all of the annular tracks within the second recording area on the disc-shaped recording medium are occupied with the recorded information signals prior to the recording operation on the information signals and if the annular tracks within the second recording area on the disc-shaped recording medium have been detected as being fully occupied with the information signals, then the information signal is recorded by moving said head to the annular tracks within the first recording area on the disc-shaped recording medium, starting from an annular track which is located on the outer side of the disc-shaped recording medium and has no information signal recorded therein toward another annular track which is located on the inner side of the disc-shaped recording medium and has no information signal recorded therein.

4. A method for recording an information signal on a disc-shaped recording medium which consists of a first recording area composed of a plurality of mutually concentrically arranged annular tracks and a second recording area located coaxially relative to the first recording area and composed of a plurality of mutually concentrically arranged annular tracks, with the first and second recording areas being stationarily set, the method comprising:

a) a first step of recording the information signal by using only the plurality of annular tracks in the first recording area by restricting the head to be movable only in the first recording area when the information signal is continuously recorded by using the plurality of annular tracks as a first recording mode, and recording the information signal by using the plurality of annular tracks in the first and second recording areas by making the head movable across the first and second recording areas as a second recording mode, and thereby instructing performance of the recording operation of the information signal according to the first recording mode or the second recording mode; and b) a second step of starting, when an instruction is given by the first step to record the information signal according to the second recording mode, the recording operation of the information signal on the plurality of annular tracks located within the second recording area of the disc-shaped recording medium, not on the plurality of annular tracks located within the first recording area of the disc-shaped recording medium.

5. A method according to claim 4, wherein said second step is arranged such that, when the instruction is given in the first step to record the information signal according to the second recording mode, the recording operation of the information signal is performed by moving said head to the annular tracks within the second recording area on the disc-shaped recording medium, one after another, starting from an annular track which is located on the outer side of the disc-shaped recording medium and has no information signal recorded therein toward another annular track which is located on the inner side of the disc-shaped recording medium.

6. A method according to claim 4, wherein said second step is arranged such that, when the instruction is given in the first step to record the information signal according to the second recording mode, it is detected whether or not all of the annular tracks within the second recording area on the disc-shaped recording medium are occupied with the recorded information signals prior to the recording operation of the information signal and if the annular tracks within the second recording area on said disc-shaped recording medium have been detected as being fully occupied with the information signals, then the information signal is recorded by moving said head to the annular tracks within the first recording area on the disc-shaped medium, starting from an annular track which is located on the outer side of the disc-shaped recording medium and has no information signal recorded therein toward another annular track which is located on the inner side of the disc-shaped recording medium.

* * * * *

UNITED STATES PATENT AND TRADEMARK OFFICE
CERTIFICATE OF CORRECTION

PATENT : 5,940,241
DATED : August 17, 1999
INVENTOR(S) : Takao Sasakura

It is certified that error appears in the above-identified patent and that said Letters Patent is hereby corrected as shown below:

On the title page, below item [73] insert the following:
--[*] Notice: This patent issued on a continued prosecution application filed under 37 CFR 1.53(d), and is subject to the twenty year patent term provisions of 35 U.S.C. 154(a)(2).--.

Signed and Sealed this

Second Day of May, 2000

*Attest:*

Q. TODD DICKINSON

*Attesting Officer*     Director of Patents and Trademarks